(No Model.)
2 Sheets—Sheet 1.
N. W. PRATT.
STEAM GENERATOR.
No. 323,881. Patented Aug. 4, 1885.
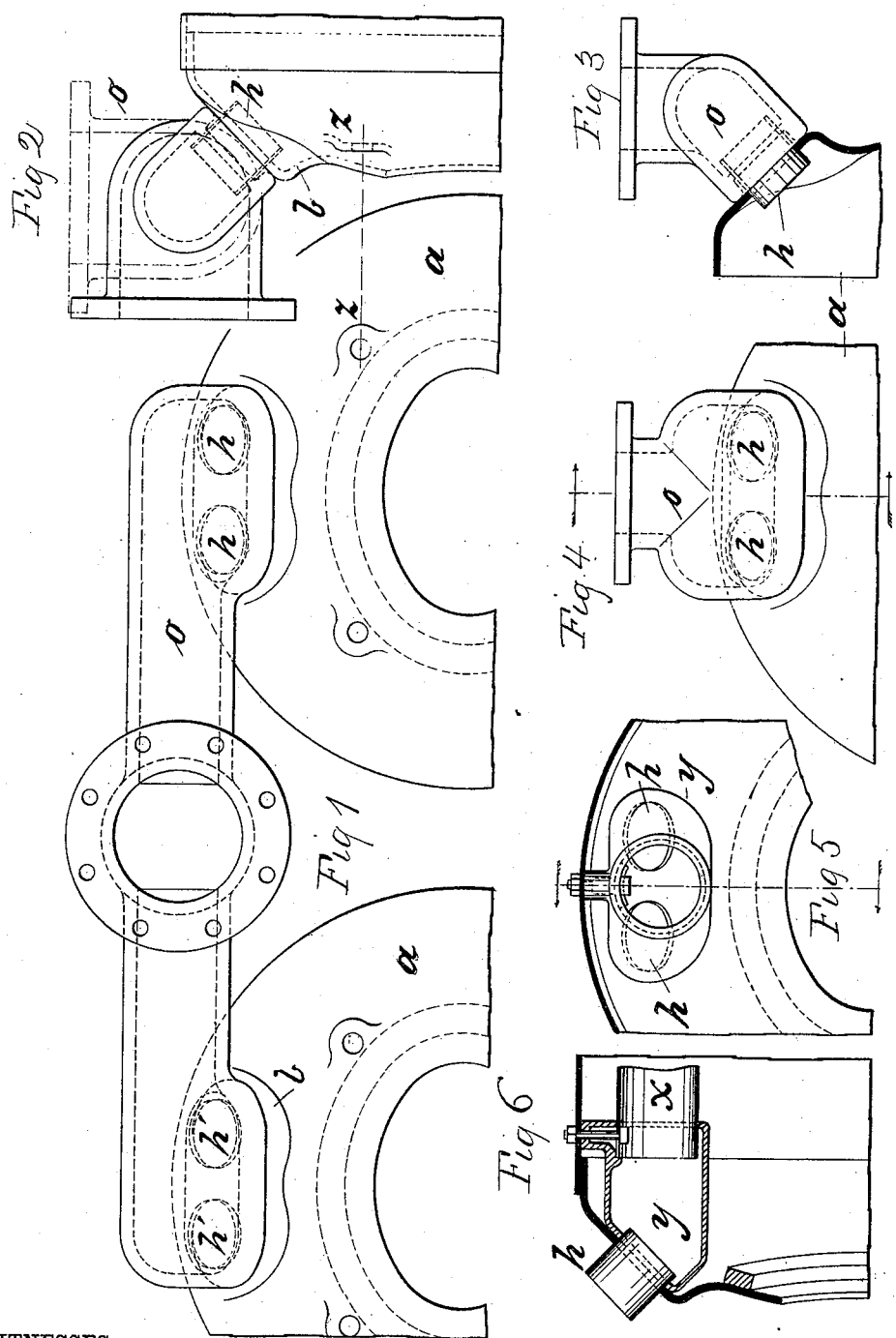
WITNESSES:
INVENTOR
BY
ATTORNEY (No Model.) 2 Sheets—Sheet 2.

N. W. PRATT.
STEAM GENERATOR.

No. 323,881. Patented Aug. 4, 1885.

WITNESSES: INVENTOR
John S Caldwell Nathaniel W Pratt
Edmund Kent Jr BY
Charles H Gordon
ATTORNEY N. PETERS, Photo-Lithographer, Washington, D. C.

UNITED STATES PATENT OFFICE.

NATHANIEL W. PRATT, OF BROOKLYN, ASSIGNOR TO THE BABCOCK & WILCOX COMPANY, OF NEW YORK, N. Y.

STEAM-GENERATOR.

SPECIFICATION forming part of Letters Patent No. 323,881, dated August 4, 1885.

Application filed January 13, 1885. (No model.)

*To all whom it may concern:*

Be it known that I, NATHANIEL W. PRATT, a citizen of the United States, residing at Brooklyn, in the county of Kings and State of New York, have invented certain new and useful Improvements in Steam-Generators, of which the following is a specification, reference being had to the accompanying drawings, forming a part of the same, in which—

Figures 1, 2, 3, 4, 5, 6, 7, 8, 9, and 10 embrace detached and enlarged views of the various parts, which will be particularly referred to in the descriptive portion of the specification.

Figure 7:
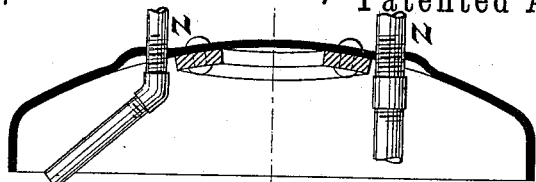
Figure 8:
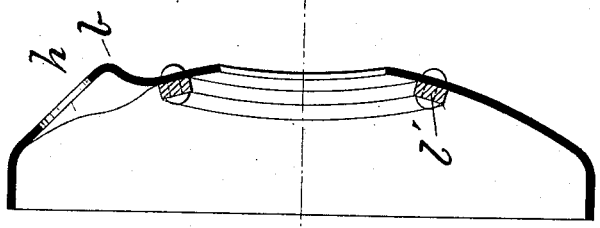
Figure 9:
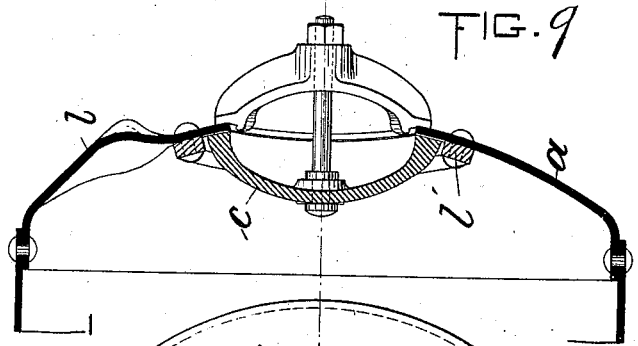
Figure 10:
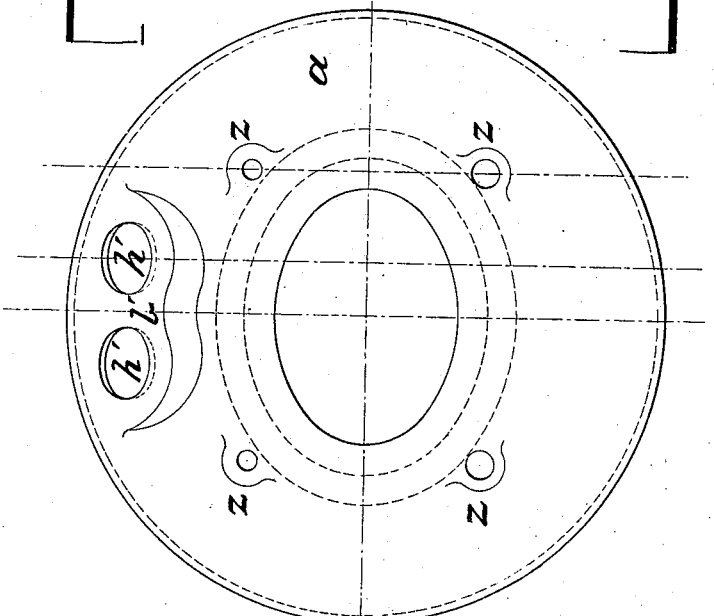

In the drawings the heads of the steam-drum are convex in form, as shown at *a*, Fig. 9. The exterior surfaces of these heads contain two or more bosses, *z z*, Fig. 10, with flat faces at right angles to the axis of the drum, to which pipe-connections may be made for the water-gage or other purposes, as shown in the enlarged views, Fig. 7. Near the upper portion of the heads a boss, *b*, is raised at an angle of forty-five degrees to the horizontal axis of the drum, and provided with one or more openings for the purpose of making the steam-pipe connections, either when a single drum is used, as shown in Figs. 3 and 4, or when two drums are connected, as shown in Fig. 1.

The faces or flanges of the steam-nozzles *o o*, that abut against the boss *b*, are made at a corresponding angle of forty-five degrees to the vertical, and are connected therewith by means of expanded nipples *h*. The outer or opposite end of the nozzle is constructed with a flange, or threaded, and placed at an angle of one hundred and thirty-five degrees to the nippled opening, so that it may be used to take the steam in either a vertical or horizontal direction by merely reversing it upon the boss *b*, as shown in Fig. 2.

In one of the heads of the steam-drum a man-hole opening is made, as shown, enlarged in Fig. 9; and in order to make up for the metal removed and to stiffen the head, a ring, *l*, is riveted thereto, surrounding the opening at a sufficient distance from it to leave a seat for the man-hole plate *c*, directly upon the head itself, a rubber gasket being interposed to form a steam-tight joint.

Placing the stiffening-ring *l* away from the edge of the opening, as shown in Fig. 9, allows the use of ordinary rivets in securing it in place and no caulking is necessary, whereas if it is placed flush with the opening, countersunk rivets would be required and the edge of the sheet caulked against the ring to prevent leakage between it and the head.

Having thus fully fully described my invention, what I claim, and desire to secure by Letters Patent, is—

1. A convex drum-head having a flat projection raised at an angle of forty-five degrees to its axis, substantially as set forth.

2. A convex drum-head provided with a man-hole opening surrounded by a re-enforcing ring, of larger internal diameter, to include the man-hole plate and leave a bearing or seat for said plate directly upon the head, substantially as described.

3. An elbow-connection in which the axis of the two branches make an angle of one hundred and thirty-five degrees, constructed with one flanged or threaded end and one fitted to receive one or more expanded nipples, substantially as described.

4. A pipe-connection with elbows of forty-five degrees angle, each fitted to receive one or more expanded nipples, combined with one or more outlet openings, the axis of which make an angle of one hundred and thirty-five degrees to the plane of said elbow, substantially as described.

5. An interposed steam-fitting forming a connection of the dry-pipe and steam-pipe, that can be reversed to cause the connected pipe to stand in either a vertical or horizontal plane when desired.

NATHANIEL W. PRATT.

Witnesses:
CHAS. W. FORBES,
C. R. WATERBURY.